(12) United States Patent
Brooker

(10) Patent No.: US 8,760,780 B1
(45) Date of Patent: Jun. 24, 2014

(54) SYSTEM AND METHOD FOR DISK SECTOR FAILURE PREDICTION

(75) Inventor: Marc J. Brooker, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 131 days.

(21) Appl. No.: 13/427,788

(22) Filed: Mar. 22, 2012

(51) Int. Cl.
*G11B 27/36* (2006.01)

(52) U.S. Cl.
USPC .......................................... 360/31; 714/794

(58) Field of Classification Search
USPC ............... 360/31, 40, 47, 53, 54; 711/712; 714/794, 774
See application file for complete search history.

(56) References Cited

U.S. PATENT DOCUMENTS

| | | | |
|---|---|---|---|
| 5,903,410 A * | 5/1999 | Blaum et al. | 360/77.08 |
| 8,345,369 B2 * | 1/2013 | Xia et al. | 360/51 |
| 8,413,029 B2 * | 4/2013 | Rauschmayer et al. | 714/794 |
| 2007/0266300 A1 * | 11/2007 | Ito et al. | 714/770 |
| 2009/0204852 A1 * | 8/2009 | Diggs et al. | 714/42 |
| 2010/0192043 A1 * | 7/2010 | Alrod et al. | 714/763 |
| 2011/0209026 A1 * | 8/2011 | Xia et al. | 714/752 |

* cited by examiner

*Primary Examiner* — Tan X Dinh
(74) *Attorney, Agent, or Firm* — Baker & Hostetler LLP

(57) ABSTRACT

A system and method for predicting the likelihood of failure of the individual sectors of a magnetic storage disk based upon the monitoring of adjacent sector performance in responding to access requests. The prediction for a specific target sector's fidelity can be made through the gathering of sector performance data that occurs during normal read/write actions to the adjacent sectors, without a recent access request necessarily being made to the target sector. Scrubbing of the sectors can also be directed based upon the needed sector access data for target sector fidelity prediction.

32 Claims, 4 Drawing Sheets

SYSTEM AND METHOD FOR DISK SECTOR FAILURE PREDICTION

BACKGROUND

Magnetic disk drives store data in sectors that are discreet portions of surface space on the disk. Latent sector errors are magnetic disk drive errors which are failures to correctly read data from a sector disk. These latent sector errors have a number of causes, including undetected write failures (such as "high fly" writes where the disk head was not close enough to the sector to correctly encode the data), physical damage to the disk medium (such as scratches) and deterioration of the disk medium or disk head. In redundant storage systems, latent sector errors reduce data durability because they are not typically detected until data needs to be read from the disk sector and the latent error is detected.

One problem is that in a data-redundant system where data is typically only stored in two locations, the failure to read data in one location may be the only time the second backup storage location is checked. Thus, in a write dominated storage system, the common case of reads is re-replication after the failure of a single replica. The presence of an undetected latent sector error during re-replication can accordingly cause data loss.

To reduce data loss in most disk storage systems, the magnetic disks periodically "scrubbed," e.g. intentionally accessed, to ensure that data on disks is still readable. The scrubbing process is a simple read (or equivalent SCSI command) to pull the data off the disk. Scrubbing strategies include a simple linear read of the disk, staggered strategies and strategies adaptive to the arrival time of disk failures. However, disk scrubbing costs disk head movement, disk wear, and disk I/O bandwidth, and negatively effects both disk lifetime and overall storage system performance.

DETAILED DISCLOSURE

In overview, this disclosure describes a system and method for predicting, at least sector failure on a magnetic storage disk, and possible overall disk failure, through predictive analysis of sector access data that is gathered from normal disk sector accesses and not necessarily through scrubbing. The system and method uses adjacent sector accesses within the plurality of sectors, typically done by at least one head that selectively accesses data at each sector on the storage disk, and a monitor gathers the data for data accesses by the head at individual sectors. The monitor then determines the likelihood of the failure of at least one first sector based upon the access of the head to at least one adjacent second sector within the plurality of sectors. Through such methodology, a prediction can be made as to sector fidelity without necessarily having had recent access, e.g. a read or write operation, to the first sector.

The first sector and second sectors can be contiguous, or only proximal to each other and non-contiguous. Furthermore, the prediction can be made based upon access to a plurality of sectors adjacent the first sector within the plurality of sectors.

Figure 1:
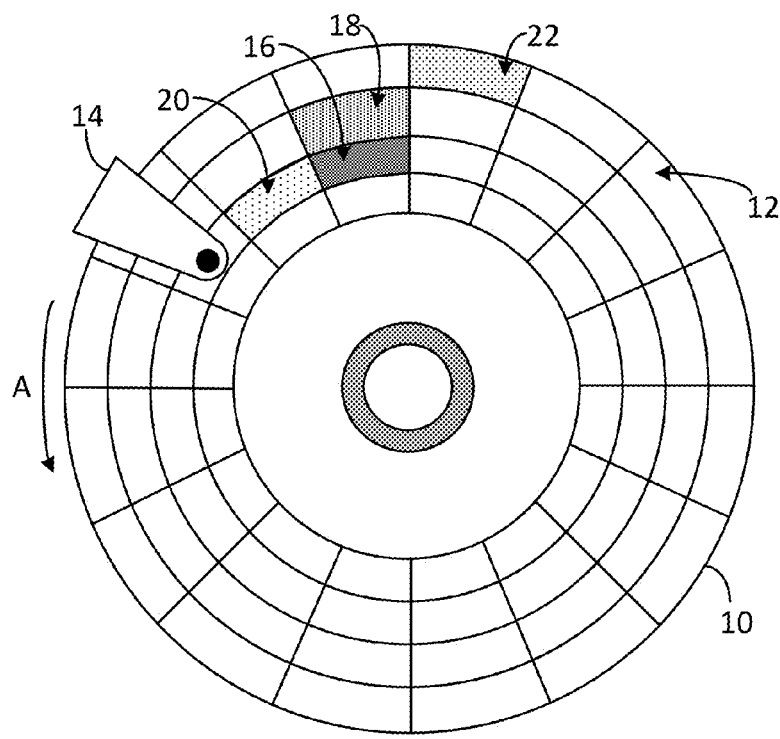
FIG. 1 is a top view of an embodiment of a magnetic storage disk with a plurality of storage sectors being read by spinning under a disk head.

As shown more particularly in FIG. 1, a magnetic storage disk 10 is shown in top view a plurality of storage sectors 12 being read by spinning (in the direction of arrow A) under a disk head 14. Within the plurality of sectors 12, a target sector 16 is adjacent and contiguous with sectors 18 and 20, and proximal and non-contiguous with sector 22 within the plurality of sectors. In this embodiment, at least one head 14 will selectively access data at each sector on the storage disk 10. A plurality of heads can likewise be used to read and write data, and heads can be present on both sides of a storage disk 10.

Figure 2:
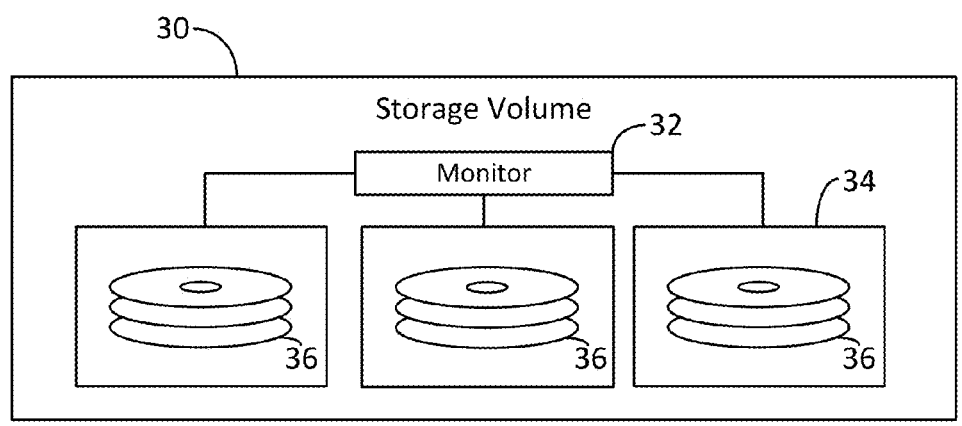
FIG. 2 is a block diagram of a storage volume having a plurality of magnetic disks, with a monitor resident on the volume that tracks the success of accesses to the plurality of disks.

Thus, as shown in FIG. 2, a monitor 32 can be resident on a storage volume 30 that gathers the data for data accesses by the head 14 at individual sectors, such as sectors 16, 18, 20, 22, within the plurality of sectors 12. The monitor 32 then can determine the likelihood of the failure of at least one first sector, such as sector 16, based upon the access of the head 14 to at least one adjacent second sector, such as sector 18 within the plurality of sectors 12. The methodology of the monitor 32 in determining sector fidelity takes utilizes the effect of latent sector errors tending to occur in clusters, with the probability of a latent sector error in a sector being highly correlated with the existence of latent sector errors in nearby sectors. Thus, for sector 16, a latent error occurring in contiguous sector 20, or even proximal and non-contiguous sector 22, can indicate the likelihood that sector 16 is likely compromised as well.

Thus, for each sector (S) on a disk can have an associated probability (or degree of belief) p(S) that it contains an undetected latent sector error, where the probability is a function of the time since the sector was last accessed, e.g. read or written, and can also include the age of the disk, and the history of the disk. In addition to these factors, latent sector errors tend to not be evenly distributed around the disk surface, and tend to be clustered closely together on the surface of the magnetic disk 10. Therefore, p(S1) for a sector S1 is also a function of the probability of a latent sector error in other nearby sectors. Similarly, latent sector errors tend to be clustered in time, so p(S1) is also a function of the last time of detection of a latent sector error on the entire disk.

In one embodiment, the system takes advantages of the reads being naturally performed by the storage system (in response to user reads or re-replication), and can also take advantage of extant scrubbing processes and improve their performance. Thus, a scrubbing system can take advantage of these properties to find an optimal set of scrubbing operations which are most likely to detect any latent sector errors with the least I/O cost.

Therefore, in one embodiment, the current probability p(S) is tracked for each sector on the magnetic disk 10. When any sector is read or written (successfully or unsuccessfully) by either the scrubbing system or the storage system itself, the new information about the health of sectors is then propagated to nearby sectors using a Bayesian belief-propagation model. A successful read, for example, will reduce the likelihood that nearby sectors contain latent sector errors. The scrubbing process then uses the set of beliefs to determine the sector with the highest likelihood of containing a latent sector error, and can either scrub (reads) that sector next, or indicate the likelihood of a failed sector and cause data back-up to occur. Using this method, the maximum likelihood of data loss for any sector on the disk is optimally reduced at any chosen rate of disk scrubbing. Thus, it can be seen that the system and methodology can be used in a scrubbing strategy which co-operates with the storage system server software, and takes advantage of the statistical properties of latent sector errors to improve durability without increasing scrubbing speed. Furthermore, in one embodiment, the current probabilities for each sector p(S) are continuously updated to mark the passage of time and optimize the accuracy of the belief.

Accordingly, with reference again to FIG. 2, a storage volume 30 can have the monitor 32 resident thereupon, and there can be one or more magnetic disk storage arrays 34, that each have a plurality of magnetic storage disks 36. In a common configuration, the storage volume 30 will have twelve magnetic storage disks for data storage. The present system and method are thus scalable from a single magnetic storage disk 10 (in FIG. 1) to a large plurality of storage disks 36 that are resident on a storage volume 30 which can be part of a much larger data storage system, as such as that shown in FIG. 3.

Figure 3:
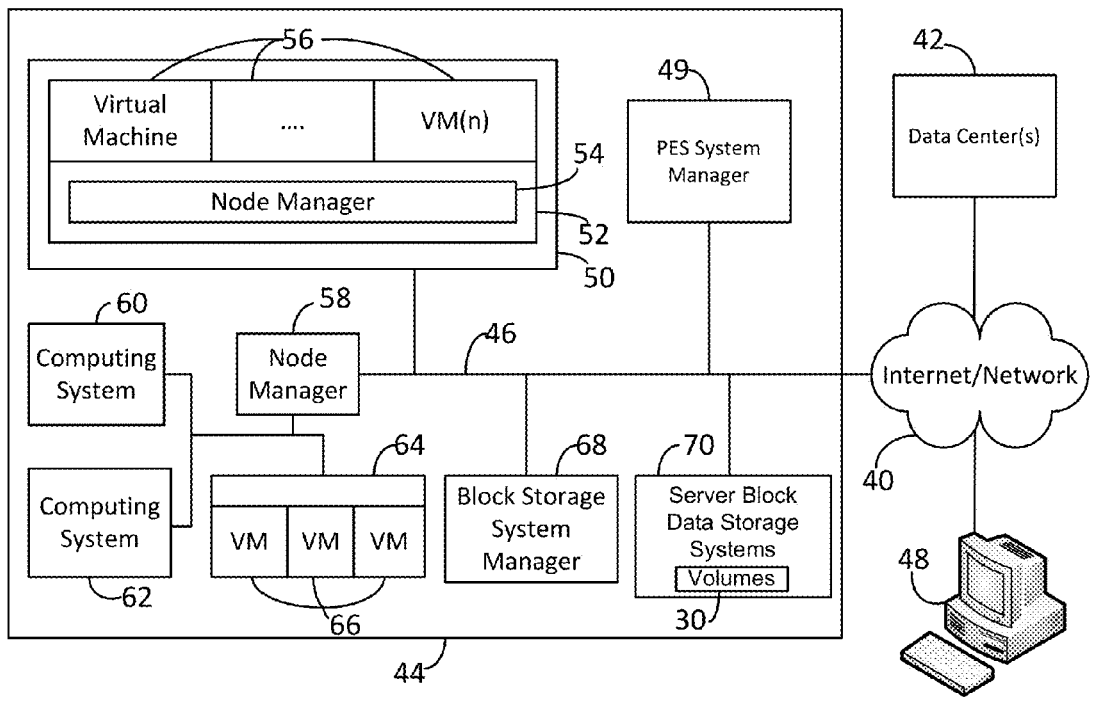
FIG. 3 is a network diagram illustrating an environment in which multiple computing systems execute programs and access reliable networked non-local block data storage that include at least one volume such as that shown in FIG. 2.

FIG. 3 is a network diagram illustrating an exemplary embodiment in which multiple computing systems execute programs and access reliable networked non-local block data storage, such as under the control of a block data storage service and/or program execution service. In particular, in this example, a program execution service manages the execution of programs on various host computing systems located within a data center 44, and a block data storage service uses multiple other server block data storage systems at the data center to provide reliable non-local block data storage to those executing programs. Multiple remote archival storage systems external to the data center may also be used to store additional copies of at least some portions of at least some block data storage volumes.

Exemplary data center 44 also includes a computing system 48 that executes a Block Data Storage ("BDS") System Manager 68 module for the block data storage service to assist in managing the availability of non-local block data storage to programs executing on computing nodes provided by the host computing systems located within the data center (or optionally on computing systems located in one or more other data centers 42, or other remote computing systems 48 external to the data center). In particular, in this example, the data center 44 includes one or more server block data storage systems 70, which each have local block storage for use in storing one or more volume copies 30. Access to the volume copies 30 is provided over the internal network(s) 46 to programs executing on computing nodes 50 and managed computer systems 60 and 62.

A BDS System Manager 68 module may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the BDS System Manager 68 module may coordinate with the Node Manager modules 54 and 58 to manage use of volumes by programs executing on associated computing nodes, while in other embodiments the Node Manager modules 54 and 58 may not be used to manage such volume use. In addition, in other embodiments, one or more BDS System Manager 68 modules may be structured in other manners, such as to have multiple instances of the BDS System Manager 68 executing in a single data center (e.g., to share the management of non-local block data storage by programs executing on the computing nodes provided by the host computing systems located within the data center), and/or such as to have at least some of the functionality of a BDS System Manager module being provided in a distributed manner by software executing on some or all of the server block data storage systems 70 (e.g., in a peer-to-peer manner, without any separate centralized BDS System Manager module on a computing system).

In this example, there can be various host computing systems such as host computer node 50, server block data storage systems 70, and computing systems 60 and 62 are interconnected via one or more internal networks 46 of the data center, which may include various networking devices (e.g., routers, switches, gateways, etc.) that are not shown. In addition, the internal networks 46 are connected to an external network 40 (e.g., the Internet or other public network) in this example, and the data center 44 may further include one or more optional devices (not shown) at the interconnect between the data center 44 and an external network 40 (e.g., network proxies, load balancers, network address translation devices, etc.). In this example, the data center 44 is connected via the external network 40 to one or more other data centers 42 that each may include some or all of the computing systems and storage systems illustrated with respect to data center 44, as well as other remote computing systems 48 external to the data center. The other computing systems 48 may be operated by various parties for various purposes, such as by the operator of the data center 44 or third parties (e.g., customers of the program execution service and/or of the block data storage service). In addition, one or more of the other computing systems 48 may be archival storage systems (e.g., as part of a remote network-accessible storage service) with which the block data storage service may interact, such as under control of one or more archival manager modules (not shown) that execute on the one or more other computing systems 48 or instead on one or more computing systems of the data center 44, as described in greater detail elsewhere.

Furthermore, while not illustrated here, in at least some embodiments, at least some of the server block data storage systems 70 may further be inter-connected with one or more other networks or other connection mediums, such as a high-bandwidth connection over which the server storage systems 70 may share volume data (e.g., for purposes of replicating copies of volumes and/or maintaining consistency between primary and mirror copies of volumes), with such a high-bandwidth connection not being available to the various host computing systems, such as computing systems 60 and 62 in at least some such embodiments. It should be appreciated that the example of FIG. 3 has been simplified for the purposes of explanation, and that the number and organization of host computing systems, server block data storage systems and other devices may be much larger than what is depicted in FIG. 3.

For example, as one illustrative embodiment, there may be approximately Four-Thousand computing systems per data center, with at least some of those computing systems being host computing systems that may each host fifteen virtual machines, and/or with some of those computing systems being server block data storage systems that may each store several volume copies. If each hosted virtual machine executes one program, then such a data center may execute as many as sixty thousand program copies at one time. Furthermore, hundreds or thousands (or more) volumes may be stored on the server block data storage systems, depending on the number of server storage systems, size of the volumes, and number of mirror copies per volume. It will be appreciated that in other embodiments, other numbers of computing systems, programs and volumes may be used.

In this example, data center 44 includes one or more racks, and each rack includes a number of host computing systems such as computer node 50, as well as an optional rack support computing systems 52. The host computing nodes 50 on the rack each host one or more virtual machines 56 in this example, as well as a distinct Node Manager module 54 associated with the virtual machines on that host computing system to manage those virtual machines. One or more other host computing systems 64 also each host one or more virtual machines 66 in this example. Each virtual machine 66 may act as an independent computing node for executing one or more program copies (not shown) for a user (not shown), such as a customer of the program execution service. In addition, this exemplary data center 44 further includes additional host computing systems 60 and 62 that do not include distinct virtual machines, but may nonetheless each act as a computing node for one or more programs (not shown) being executed for a user.

In this example, a Node Manager module 58 executing on a computing system (not shown) distinct from the host computing systems 60 and 62 is associated with those host computing systems to manage the computing nodes provided by those host computing systems, such as in a manner similar to the Node Manager Module 54 for host computing node 50. A rack support computing system 52 may provide various utility services for other computing systems local to its rack (e.g., long-term program storage, metering and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

In this example, an optional computing system is also illustrated that executes a program execution system ("PES System") Manager module 49 for the program execution service to assist in managing the execution of programs on the computing nodes provided by the host computing systems located within the data center (or optionally on computing systems located in one or more other data centers 42, or other remote computing systems 48 external to the data center), the PES System Manager module 49 may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc. In some embodiments, the PES System Manager module 49 may coordinate with the Node Manager modules 54 and 58 to manage program execution on computing nodes associated with the Node Manager modules, while in other embodiments the Node Manager modules 54 and 58 may not assist in managing such execution of programs.

Data centers housing significant numbers of co-located interconnected computing systems have become commonplace, such as private data centers that are operated by and on behalf of a single organization, and public data centers that are operated by entities as businesses. Some public data center operators provide network access, power, and secure installation facilities for hardware owned by various customers, while other public data center operators provide "full service" facilities that also include hardware resources made available for use by their customers. However, any of the components for the network 40, devices supporting the network, storage, memory and the like could be physical located separately from each other, in multiple data centers, or spread about various computer devices.

In particular regard to virtualization technologies for commodity hardware, there are several existing systems that provide some benefits with respect to managing large-scale computing resources for many customers with diverse needs, allowing various computing resources to be efficiently and securely shared between multiple customers. For example, virtualization technologies such as those provided by XEN, VMWare, or User-Mode Linux may allow a single physical computing system to be shared among multiple users by providing each user with one or more virtual machines VM1-VMN hosted by the single physical computing system, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies provide virtual resources that span one or more physical resources, such as a single virtual machine with multiple virtual processors that actually spans multiple distinct physical computing systems.

Figure 4:
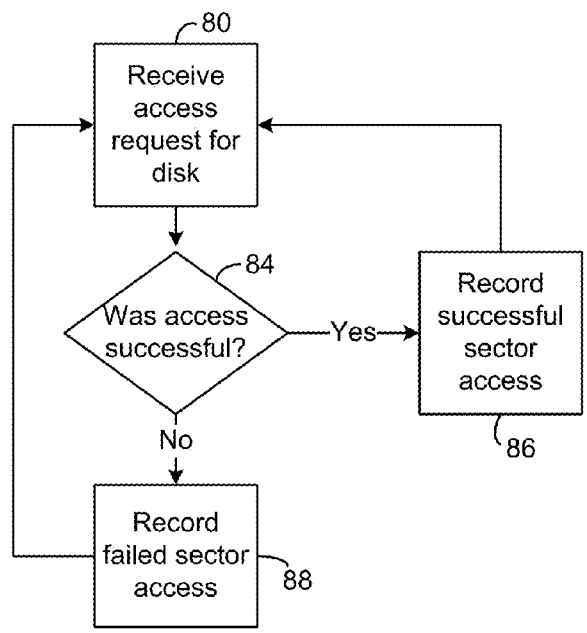
FIG. 4 is a flowchart of one embodiment of a process that monitors the handling of access requests in accessing sectors on a disk.

FIG. 4 is a flowchart of one embodiment of a process that monitors the handling of access requests in accessing sectors on a disk, such as magnetic storage disk 10 in FIG. 1. The process, in one embodiment, can be executing on a monitor such as monitor 32 in FIG. 2 that monitors access to storage disks 36. In the process, a request to access the storage disk 10 is received, as shown at step 80, and then a determination is made as to whether the access was successful, as shown at decision 84. If the access was successful, then the successful access is recorded as shown at step 86, or if the access was unsuccessful, the failed attempt is recorded as shown at step 88, and in either instance, the process iterates to receive further access requests at step 80.

The process in FIG. 4 thus allows a monitor 32 to gather data from the ongoing access requests to the storage volume 30 regarding the success of access attempts, without necessarily having to utilize scrubbed data or causing data scrubbing to occur. It should also be appreciated that at a failed attempt recordation, step 88, other actions can also occur such as an alert, or change in frequency of monitoring a group of sectors, or a complete disk scrub could be commenced. It should also be appreciated that the process of recording the accesses can be offloaded from the monitor that otherwise determines target sector fidelity that is shown in the process of FIG. 5.

Figure 5:
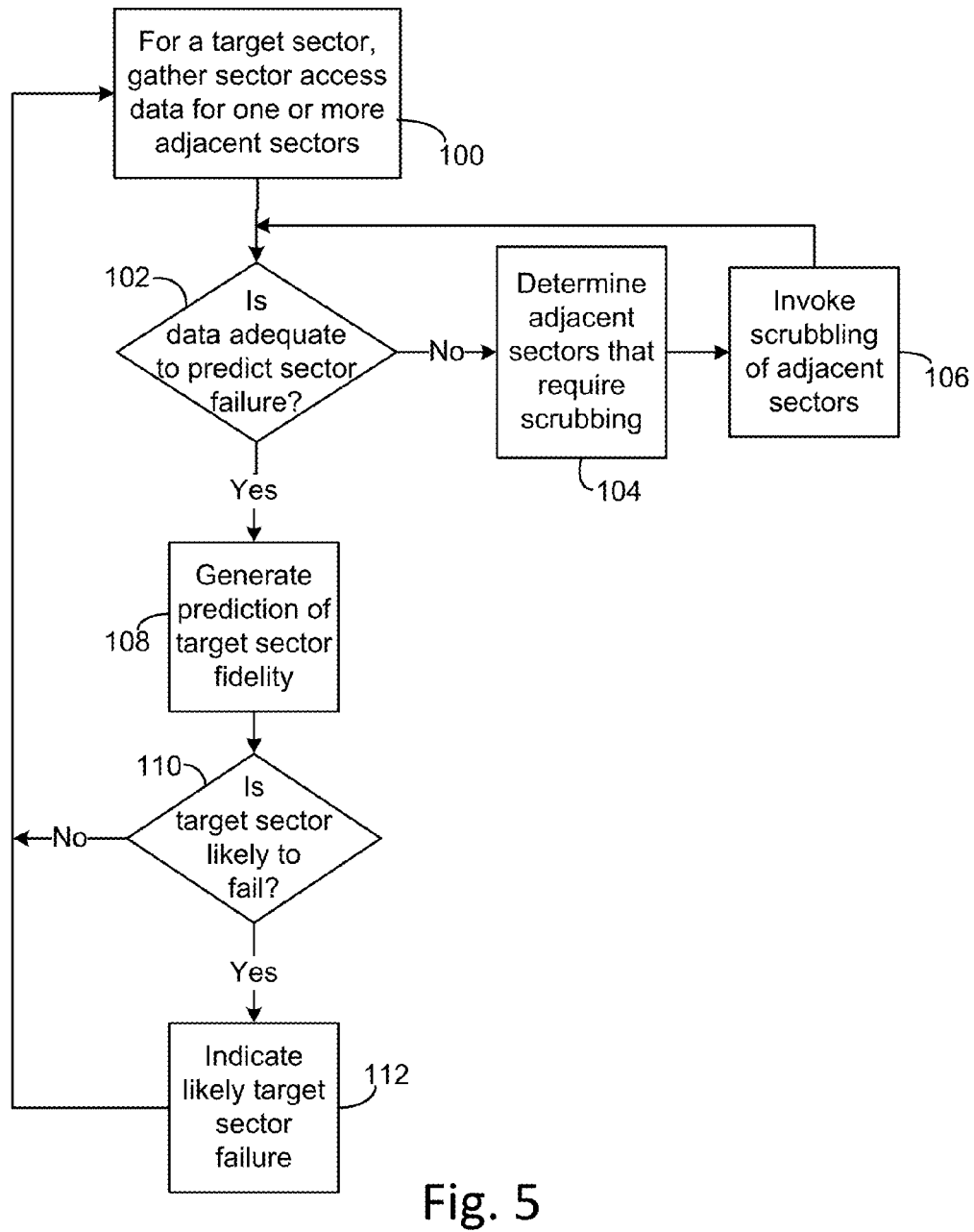
FIG. 5 is a flowchart of one embodiment of a process of monitor resident in storage volume that determines sector fidelity based upon gather sector access data.

FIG. 5 is a flowchart of one embodiment of a process of monitor 32 resident in storage volume 30 that determines sector fidelity based upon gathered sector access data. The process of FIG. 5 can occur separately from or in conjunction with the process of FIG. 4. The process commences with the sector access data gathered for each relevant adjacent sector to the target sector, as shown at step 100. The gathered data can be from ordinary access data to the sectors, or data gathered from purposeful scrubbing of the disk. Thus, with FIG. 1 as an example, if sector 16 is the target sector, then the access data can be gathered for the adjacent sectors 18, 20, 22. A determination is then made as to whether the gathered data is adequate to predict sector fidelity (or sector failure) as is shown at decision 102. If there is not adequate data at decision 102, then the adjacent sectors that need scrubbing as determined at step 104, are scrubbed as the scrubbing of those sectors is invoked, as shown at step 106, and then the process iterates to determine if adequate data has been collected at decision 102. In this embodiment, the process thus can direct purposeful scrubbing when necessary to obtain adequate data for sector fidelity prediction without need to cause a full scrubbing of the disk, and the directed scrub can occur at a more opportune time in the disk operations, such as head proximity to sectors to be scrubbed and lower I/O requests to the disk.

Otherwise, if there is adequate data to make a prediction on sector fidelity at decision 102, then the prediction of sector fidelity is generated, as shown at step 108, and then a determination of whether the target sector is likely to fail is made, as shown at decision 110. If the target sector is likely to fail at decision 110, then the likely failure of the target sector is indicated, as shown at step 112. It should be appreciated that at step 112, other processes can likewise occur in response to impending sector failure, such as indicating overall disk failure, causing the migration of data from the disk, increasing the overall disk scrubbing activities, and the determination of more target sectors to be examined. If the target sector is not likely to fail at decision 110, or otherwise after the indication of likely target sector failure at step 112, the process iterates to examine other target sectors at step 100.

The process in FIG. 5 can accordingly be performed at a periodic rate on the disk, or can itself be invoked by an external factor, such as a latent sector error being found on the disk, or the disk hitting a certain number of operations or length in operation. Moreover, the process of FIG. 5 can be done in parallel with other like processes on the monitor 32 in reviewing target sectors within the storage volume 30.

Figure 6:
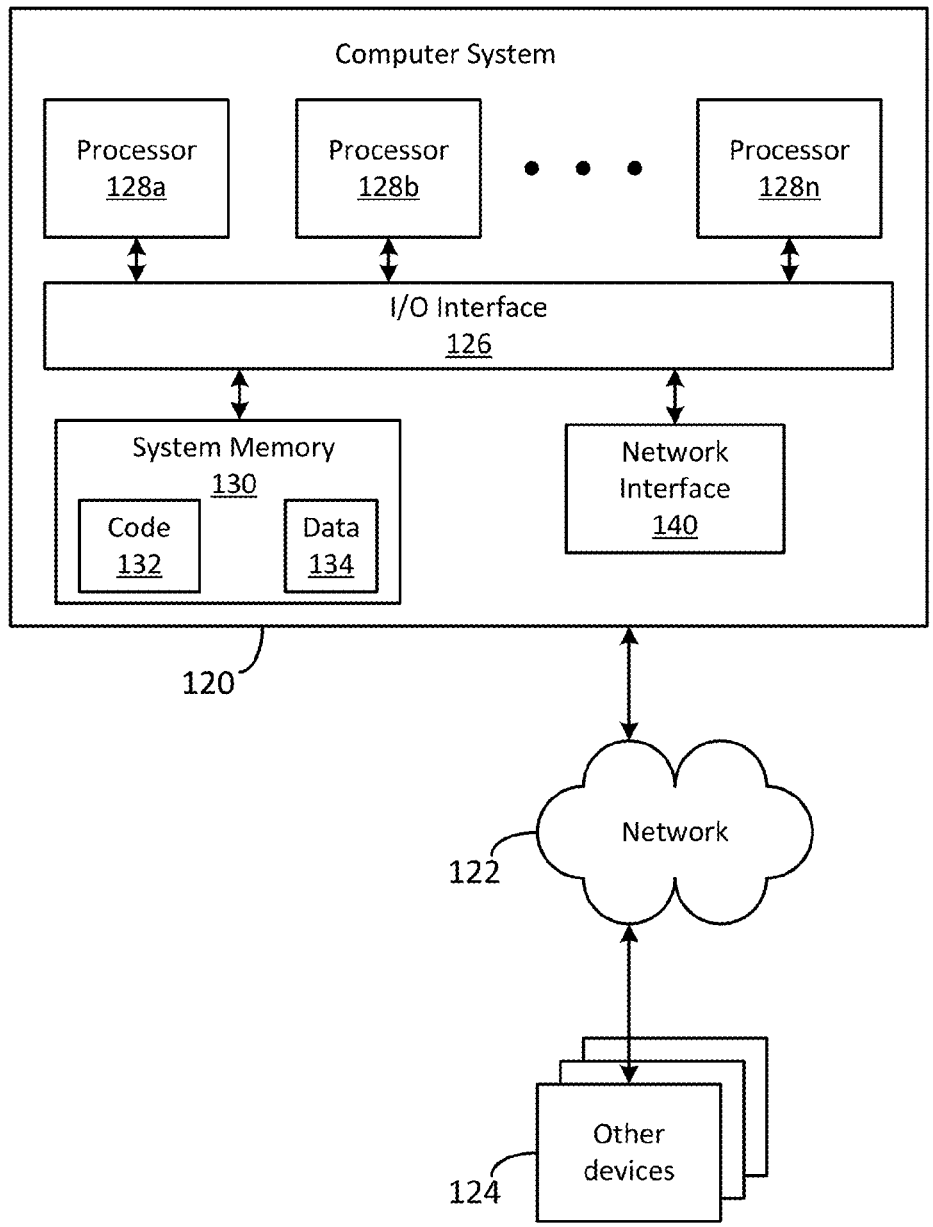
FIG. 6 is a block diagram illustrating an exemplary computer system that may be used in some embodiments

In at least some embodiments, a server that implements a portion or all of one or more of the technologies described herein, including the techniques to implement the functionality of predicting disk or sector failure, may include a general-purpose computer system that includes or is configured to access one or more computer-accessible media, such as computer system 120 illustrated in FIG. 6. In the illustrated embodiment, computer system 120 includes one or more processors 128 coupled to a system memory 130 via an input/output (I/O) interface 126. Computer system 120 further includes a network interface 140 coupled to I/O interface 126.

In various embodiments, computer system 120 may be a uniprocessor system including one processor 128, or a multiprocessor system including several processors 128a-128n (e.g., two, four, eight, or another suitable number). Processors 128a-128n may be any suitable processors capable of executing instructions. For example, in various embodiments, processors 128a-128n may be general-purpose or embedded processors implementing any of a variety of instruction set architectures (ISAs), such as the x86, PowerPC, SPARC, or MIPS ISAs, or any other suitable ISA. In multiprocessor systems, each of processors 128a-128n may commonly, but not necessarily, implement the same ISA.

System memory 130 may be configured to store instructions and data accessible by processor(s) 128a-128n. In various embodiments, system memory 130 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 130 as code 132 and data 134.

In one embodiment, I/O interface 126 may be configured to coordinate I/O traffic between processors 128a-128n, system memory 130, and any peripheral devices in the device, including network interface 140 or other peripheral interfaces. In some embodiments, I/O interface 126 may perform any necessary protocol, timing or other data transformations to convert data signals from one component (e.g., system memory 130) into a format suitable for use by another component (e.g., processor 128a). In some embodiments, I/O interface 126 may include support for devices attached through various types of peripheral buses, such as a variant of the Peripheral Component Interconnect (PCI) bus standard or the Universal Serial Bus (USB) standard, for example. In some embodiments, the function of I/O interface 126 may be split into two or more separate components, such as a north bridge and a south bridge, for example. Also, in some embodiments some or all of the functionality of I/O interface 126, such as an interface to system memory 130, may be incorporated directly into one or more processors 128a-128n.

Network interface 140 may be configured to allow data to be exchanged between computer system 120 and other devices 124 attached to a network or networks 122, such as other computer systems or devices as illustrated in FIGS. 1-5, for example. In various embodiments, network interface 140 may support communication via any suitable wired or wireless general data networks, such as types of Ethernet network, for example. Additionally, network interface 140 may support communication via telecommunications/telephony networks such as analog voice networks or digital fiber communications networks, via storage area networks such as Fibre Channel SANs, or via any other suitable type of network and/or protocol.

In some embodiments, system memory 130 may be one embodiment of a computer-accessible medium configured to store program instructions and data as described above for FIGS. 1-5 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 120 via I/O interface 126. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 120 as system memory 130 or another type of memory. Further, a computer-accessible medium may include transmission media or signals such as electrical, electromagnetic, or digital signals, conveyed via a communication medium such as a network and/or a wireless link, which may be implemented via network interface 140. Portions or all of multiple computer systems such as that illustrated in FIG. 6 may be used to implement the described functionality in various embodiments; for example, software components running on a variety of different devices and servers may collaborate to provide the functionality.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different manners in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

What is claimed is:

1. A system for predicting sector failure on a magnetic storage disk, comprising:
    at least one magnetic storage disk having a plurality of sectors thereupon, the sectors selectively storing data, at least some of the sectors being adjacent to one another;
    at least one head configured to selectively access data stored on the plurality of sectors on the at least one magnetic storage disk; and
    at least one processor and a memory storing computer-readable instructions that, when executed by the at least one processor, causes the system to at least:
    access data for data accesses by the head at individual sectors within the plurality of sectors; and
    determine a likelihood of failure of a first sector of the plurality of sectors without accessing data for data accesses by the head at the first sector, the likelihood determined based at least in part upon access of the head to a second sector within the plurality of sectors and a predicted relationship between failures in the first and second sectors and relative locations of the first and second sectors on the at least one magnetic storage disk.

2. The system of claim 1, wherein the head selectively accesses the data at each sector through a read or write operation.

3. The system of claim 1, wherein the first sector and second sector are contiguous.

4. The system of claim 1, wherein the first sector and second sector are proximal to each other and non-contiguous.

5. The system of claim 1, wherein the likelihood of the failure of the first sector is based upon successful access of the head to a plurality of sectors adjacent to the first sector within the plurality of sectors.

6. A system for predicting, at least, sector failure on a magnetic storage disk, comprising:
    at least one magnetic storage disk having a plurality of sectors thereupon, the sectors selectively storing data, at least some of the sectors being adjacent one another, wherein the sectors are selectively accessible; and
    at least one processor and a memory storing computer-readable instructions that, when executed by the at least one processor, causes the system to at least:
    access data for data accesses at individual sectors within the plurality of sectors and
    determine a likelihood of failure of a first sector of the plurality of sectors without accessing data for data accesses by the head at the first sector, the likelihood determined based at least in upon one or more accesses to a second sector within the plurality of sectors and a predicted relationship between failures in the first and second sectors and relative locations of the first and second sectors on the at least one magnetic storage disk.

7. The system of claim 6, wherein the one or more accesses is through a read or write operation.

8. The system of claim 6, wherein the first sector and second sector are contiguous.

9. The system of claim 6, wherein the first sector and second sector are proximal to each other and non-contiguous.

10. The system of claim 6, wherein the likelihood of the failure of the first sector is based upon access to a plurality of adjacent sectors within the plurality of sectors.

11. The system of claim 6, wherein the likelihood of the failure of the first sector is based upon intentional access to at least one adjacent second sector within the plurality of sectors.

12. The system of claim 6, wherein the likelihood of the failure of the first sector is based upon one or more accesses to the second sector within a predetermined time period.

13. The system of claim 6, wherein at least some of the plurality of sectors are scrubbed to determine sector failures, and the likelihood of the failure of the first sector is based upon one or more accesses to at least one adjacent scrubbed sector.

14. The system of claim 13, wherein the scrubbing is done to desired sectors based upon a predetermined pattern to collect sufficient data to predict the likelihood of the failure.

15. A method for predicting, at least, sector failure on a magnetic storage disk, comprising:
    selectively accessing at least one sector of a magnetic storage disk having a plurality of sectors thereupon, the magnetic storage disk configured to selectively store data on the plurality of sectors, and at least seem of the sectors being adjacent to one another;
    receiving data for data accesses at individual sectors within the plurality of sectors; and
    determining a likelihood of failure of a first sector based at least in part upon one or more data accesses to at least one adjacent sector of the plurality of sectors without accessing data for data accesses by the head at the first sector, the likelihood determined based at least in part on a predicted relationship between failures in the first sector and the at least one adjacent sector and relative locations of the first sector and the at least one adjacent sector on the magnetic storage disk.

16. The method of claim 15, wherein the data accesses comprise accessing data through a read or write operation.

17. The method of claim 15, wherein the at least one adjacent sector is contiguous to the first sector.

18. The method of claim 15, wherein the first sector and the at least one adjacent sector are proximal to each other and non-contiguous.

19. The method of claim 15, wherein the likelihood of failure is based upon the access to a plurality of adjacent sectors within the plurality of sectors.

20. The method of claim 15, wherein the likelihood of failure is based upon one or more intentional accesses to the at least one adjacent sector.

21. The method of claim 15, wherein the likelihood of failure is based upon one or more accesses to the at least one adjacent sector within a predetermined time period.

22. The method of claim 15, further comprising scrubbing at least some of the plurality of sectors to identify failed sectors, and wherein the likelihood of failure of the first sector is based upon one or more accesses to at least one adjacent scrubbed sector.

23. The method of claim 22, wherein said scrubbing is performed on sectors based upon a predetermined pattern.

24. A non-transitory computer-readable storage medium containing instructions that, when executed by one or more processors of a system, cause the system to at least:
receive data for data accesses at individual sectors of a magnetic storage disk having a plurality of sectors thereupon, at least some of the sectors being adjacent to other sectors within the plurality of sectors; and
determining a likelihood of failure of a first sector based upon one or more accesses to at least one sector adjacent to the first sector, wherein the likelihood of failure is based at least in part on a predicted relationship between failures in the first sector and the adjacent sector and relative locations of the first sector and the adjacent sector.

25. The storage medium of claim 24, wherein the data for data accesses comprises read or write operation data for individual sectors.

26. The storage medium of claim 24, wherein the adjacent sector is contiguous with the first sector.

27. The storage medium of claim 24, wherein the the first sector and adjacent sector are proximal to each other and non-contiguous.

28. The storage medium of claim 24, wherein the likelihood of failure is based upon access to data pertaining to a plurality of adjacent sectors within the plurality of sectors.

29. The storage medium of claim 24, wherein the likelihood of failure is based upon one or more intentional accesses to the adjacent sector.

30. The storage medium of claim 24, wherein the likelihood of failure is based upon one or more accesses to the adjacent sector within a predetermined time period.

31. The storage medium of claim 24, further comprising instructions that, when executed by the one or more processors, at least cause the system to scrub at least some of the plurality of sectors to identify failed sectors, and wherein the likelihood of failure is based upon one or more accesses to at least one adjacent scrubbed sector.

32. The storage medium of claim 31, further comprising instructions that, when executed by the one or more processors, at least cause the system to generate a predetermined pattern of scrubbed sectors.

* * * * *